United States Patent
Kumar et al.

(10) Patent No.: US 10,423,499 B2
(45) Date of Patent: Sep. 24, 2019

(54) CATALOGING METADATA FOR REPLICATION MANAGEMENT AND RECOVERY

(71) Applicant: NetApp, Inc., Sunnyvale, CA (US)

(72) Inventors: Ranjit Kumar, Santa Clara, CA (US); Kartheek Muthyala, Hyderabad (IN); Sisir Shekhar, Bihar (IN)

(73) Assignee: NETAPP, INC., Sunnyvale, CA (US)

( * ) Notice: Subject to any disclaimer, the term of this patent is extended or adjusted under 35 U.S.C. 154(b) by 413 days.

(21) Appl. No.: 15/081,582

(22) Filed: Mar. 25, 2016

(65) Prior Publication Data

US 2017/0277602 A1   Sep. 28, 2017

(51) Int. Cl.
*G06F 11/14* (2006.01)
*G06F 16/16* (2019.01)

(52) U.S. Cl.
CPC ...... *G06F 11/1471* (2013.01); *G06F 11/1464* (2013.01); *G06F 11/1469* (2013.01); *G06F 16/164* (2019.01); *G06F 2201/87* (2013.01)

(58) Field of Classification Search
CPC combination set(s) only.
See application file for complete search history.

(56) References Cited

U.S. PATENT DOCUMENTS

| | | | |
|---|---|---|---|
| 7,676,514 B2 | 3/2010 | Faibish et al. | |
| 7,870,356 B1 | 1/2011 | Veeraswamy et al. | |
| 8,200,638 B1 | 6/2012 | Zheng et al. | |
| 8,326,798 B1* | 12/2012 | Driscoll | G06F 17/30082 707/610 |
| 8,600,998 B1 | 12/2013 | Chaudhary et al. | |
| 8,874,864 B2 | 10/2014 | Corbett et al. | |
| 9,436,693 B1* | 9/2016 | Lockhart | G06F 17/30088 |
| 2010/0095059 A1* | 4/2010 | Kisley | G06F 3/061 711/114 |
| 2011/0016085 A1* | 1/2011 | Kuo | G06F 17/30212 707/615 |
| 2011/0072224 A1 | 3/2011 | Popovski et al. | |
| 2013/0325824 A1* | 12/2013 | Shoens | G06F 17/30115 707/698 |

(Continued)

OTHER PUBLICATIONS

International Search Report and Written Opinion for Application No. PCT/US2017/023451 dated Jun. 22, 2017, 10 pages.

(Continued)

*Primary Examiner* — Etienne P Leroux
(74) *Attorney, Agent, or Firm* — Haynes and Boone, LLP (57) ABSTRACT

A method and system for managing backup storage of file system entities. In an aspect, a file system catalog includes a database populator tool that generates records within a metadata table that may be maintained within a database. In response to detecting a replication cycle, the populator tool reads a stream of replication operations. For each of the replication operations, the populator tool determines the type of operation and in response to determining that a directory inode is an operand of the replication operation, the tool generates one or more catalog records. Each of the generated records includes and logically associates data entries corresponding to an inode number, a parent inode number, an entity type, a point-in-time-image (PTI) ID, an absolute path, and an operation.

18 Claims, 5 Drawing Sheets

(56) References Cited

U.S. PATENT DOCUMENTS

2013/0339406 A1* 12/2013 Kanfi ............... G06F 17/30082
                                                        707/825
2014/0358856 A1* 12/2014 Shitomi ................ G06F 3/061
                                                        707/626
2015/0269032 A1    9/2015 Muthyala et al.

OTHER PUBLICATIONS

Written Opinion of the International Preliminary Examining Authority for Application No. PCT/US2017/023451 dated Feb. 21, 2018, 7 pages.
Netapp., "Data ONTAP Edge", NetApp, Inc., Datasheet, Jun. 18, 2015, 2 pages.
Netapp; Information Engineering., "Clustered Data ONTAP 8.2 Logical Storage Management Guide", NetApp, Inc., Jul. 2013, 310 pages.
Netapp., "NetApp Snapshot Technology", NetApp, Inc., NetApp Datasheet, Nov. 14, 2011, 2 pages.
Netapp., "NetApp Virtual Storage Tier", NetApp, Inc., Solution Brief, Apr. 21, 2014, 4 pages.

* cited by examiner

CATALOGING METADATA FOR REPLICATION MANAGEMENT AND RECOVERY

TECHNICAL FIELD

The disclosure generally relates to the field of logical replication of stored data, and more particularly to an intermediate cataloging of file system metadata that facilitates management and recovery of replicated data storage.

BACKGROUND

Large-scale storage systems frequently utilize logical replication such as from a primary storage site to a secondary storage site to provide enhanced data security. Logical replication may be implemented in a homogeneous manner in which the storage structure paradigm is the same between the primary and secondary storage. For example, logically replicating an inode-based file system to the same inode-based file system structure in secondary storage constitutes homogeneous replication. Heterogeneous replication entails replicating data stored in one data organization format into another such as replicating from an inode-based file system to a data layout implemented in an object-based storage paradigm.

Data recovery from secondary storage may often be undertaken for purposes of recovering a relatively small portion of the total replicated data. For example, specified files and/or directories may be targeted for recovery for particularized reasons such as backup integrity checks or other reasons. In such cases, recovering an entire file system volume may be unduly costly. Alternatively, the recovery may be limited to the targeted data items. However, such targeted recovery may require substantial processing resources such as may be necessary to traverse file system or object-based data layouts to locate and retrieve the desired data items. The costs may be particularly high for recovering data items that have been heterogeneously replicated, such as from a file system primary to an object-based secondary.

BRIEF DESCRIPTION OF THE DRAWINGS

Aspects of the disclosure may be better understood by referencing the accompanying drawings.

DESCRIPTION

The description that follows includes example systems, methods, techniques, and program flows that depict aspects of the disclosure. However, it is understood that this disclosure may be practiced without some of these specific details. In other instances, well-known instruction instances, protocols, structures and techniques have not been shown in detail in order not to obfuscate the description.

A file system includes the data structures and methods/functions used to organize file system objects, access file system objects, and maintain a namespace of the file system. File system objects include directories and files. Since this disclosure relates to object-based storage (OBS) as well as file systems and "objects" in OBS, a file system object is referred to as a "file system entity" instead of a "file system object" to reduce overloading of the term "object." Thus, an "inode object," "inode file object," "inode file reference object," and "inode file data object" in this disclosure is not the data structure that represents a file in a Unix® type of operating system.

As utilized herein, a "data block number" may refer to a logical block address (e.g., volume block number) that may be mapped by a reference pointer mapping to a physical block address (e.g., an aggregate block number and/or a disk block number) at which file data content is physically stored. In addition or alternatively, a "data block number" may refer to an aggregate block address (e.g., physical volume block number) or a physical storage media block number (e.g., block address of a hard disk, solid state drive, etc.).

Methods and systems are disclosed for collecting and/or generating metadata during replication of, for example, a file system volume. The metadata can be configured into per-inode catalog records and processed to enable efficient management and recovery of replicated file system data. In one aspect, components forming a file system catalog process replication operations that are received from a source storage system within replication streams. The replication operations may include inode operations (e.g., insert or delete inode data structures) and data block operations (e.g., insert or delete data blocks). A replication engine may be configured to include a parser and object mapper for replicating data that is stored in a hierarchical file system format to a backup storage that is configured to store data in an OBS format. The replication engine may be implemented as a virtual machine (VM) that is configured to process replication operation streams received from primary/source storage and to generate replicated data storage constructs therefrom in secondary storage. The parser may be configured to identify different data and metadata file system constructs from among the file system entities within the replication operations constituting a replication data stream. In an aspect, a file system catalog is implemented within the replication engine to configure and populate a metadata database, and also to handle file system access requests targeting file system entities that are replicated in backup storage.

In an aspect, the metadata database of the file system catalog is populated during a comprehensive baseline replication cycle in which primary (source) file system data is initially replicated and mapped into OBS objects within secondary storage. Subsequent to the baseline replication and population of the metadata database, stream replication operations from the primary storage are received as point-in-time images (PTIs) of the file system, each recording the state of the file system at a particular point. For example, a PTI may embody a file system "snapshot" such as implemented by some file systems that utilize inode-based pointer resolution to organize files. Such snapshot-type PTIs record the state of the file system and therefore typically comprise a copy of the root inode of the file system in addition to block pointer information. The PTI replication stream may comprise diff streams that are packaged by a replication engine into OBS objects and stored in OBS using REST/HTTP application program interfaces (API's). The file system catalog may read the replication operations included in each PTI replication stream and enter catalog records for new file system entities or enter updated catalog records for file system entities that are recorded in earlier PTI catalog records.

Figure 1:
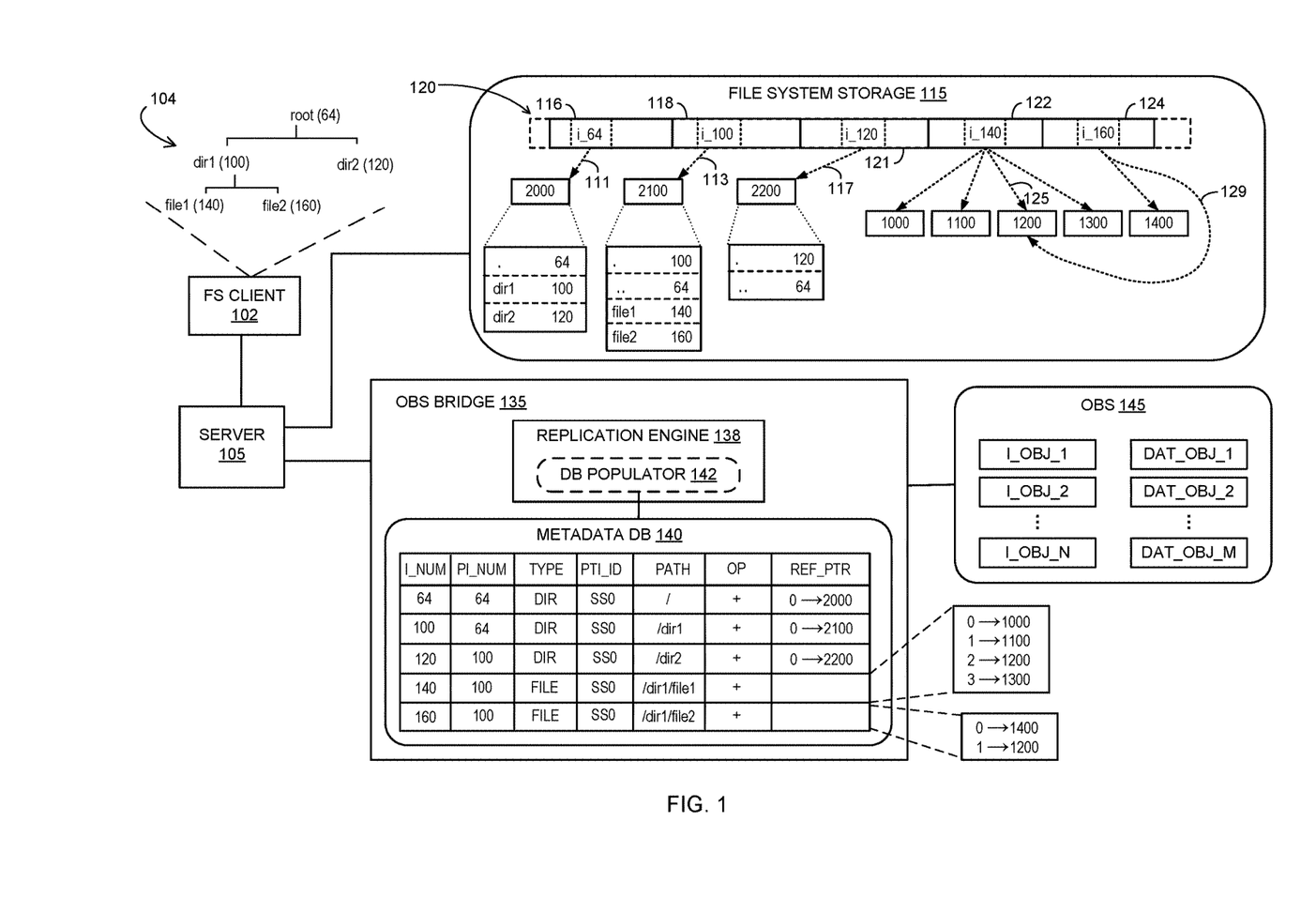
FIG. 1 is a block diagram depicting a storage replication system that implements a file system catalog in accordance with an aspect.

FIG. 1 is a block diagram depicting a storage replication system that implements a file system catalog in accordance with an aspect. The depicted storage backup system includes a primary storage system comprising a storage server 105 having a file system storage 115. A file system client 102 is communicatively coupled to storage server 105 such as via a network connection. File system client 102 includes a memory into which a file system image 104 has been loaded. The file system image 104 includes data structures, referred to herein as file system entities, of a hierarchical file system such may be implemented by a Unix-type operating system such as Linux®. Specifically, the file system image 104 comprises a top-level/root directory, root, containing lower level directories dir1 and dir2. As depicted, dir2 contains no files and dir1 contains files file1 and file2. Shown within parentheses besides each of the file system entities are inode numbers that are assigned to respective inodes of the file system and that are used to represent the respective file system entities. The inode numbers are essentially index numbers used in inode-based file systems to index file system entities in a manner enabling dereferencing of file system entity metadata and file system entity data content.

File system storage 115 contains the metadata, block pointer reference information, and data content that a storage server operating system (not depicted) uses to store and manage data. Namely, file system storage 115 includes an inode file 120 that includes inodes for recording the metadata and reference information for files and directories within the file system. File system storage 115 also includes corresponding data blocks having data block numbers 2000, 2100, 2200, 1000, 1100, 1200, 1300, and 1400. The metadata and reference information is recorded in multiple inodes, such as inodes i_64, i_100, i_120, i_140, and i_160 that are contained as data structures within file blocks 116, 118, 121, 122, and 124 of inode file 120. Each inode may consume a specified amount of storage space (e.g., 192 bytes) within storage blocks that may have fixed length (e.g., 4 KB). For example, assuming a block size of 4 KB with each inode consuming 192 bytes, a total of 21 inodes may be contained in each block. In such a configuration, the inode file block numbers (FBNs) for inodes i_64, i_100, i_120, i_140, and i_160 are 3, 4, 5, 6, and 7, respectively. Each inode contains metadata and references (e.g., block pointers) for the file system entity that it represents.

Each of file blocks 116, 118, 121, 122, and 124 is assigned a respective FBN of the inode file. As depicted, the file blocks 116, 118, 121, 122, and 124 are assigned inode file FBNs "3," "4," "5," "6," and "7," respectively. The depicted numeric references in each of the inode names designates the inode's file index number (inode number). For example, the inode number of i_64 is 64, the inode number for i_120 is 120, and similarly for the remaining inodes. As known in typical inode-based file systems, the inode numbers are unique file index numbers utilized to uniquely index the underlying files and directories within a file system.

While implementations of inode-based file systems may often utilize multiple reference levels (e.g., using double indirect pointers) for large files, only a single level is depicted in FIG. 1 for ease of illustration. Furthermore, while many inode-based file systems may implement storage virtualization in which a virtual volume blocks are mapped to physical volume blocks (e.g., within an aggregate), such virtual-to-physical volume mappings are not essential to the principles described herein and are therefore not depicted.

The metadata contained within inodes may include file/directory attributes such as type (file or directory), size, creation time, modification time, and access control information, etc. As part of or in addition to the metadata, inodes for directories and files include reference information in the form of block pointers to data blocks that contain the respective directory/file data content. The enumerated block pointers, such as block pointer 111, are contained within designated sections of each of the inodes and comprise mappings from FBNs of the indexed file system entity to data block numbers (DBNs). For instance, inode i_64 includes a pointer 111 from FBN 0 of the root directory to DBN 2000. Similarly, inodes i_100 and i_120 include pointers 113 and 117 from their respective FBN 0 to DBNs 2100 and 2200, respectively.

The content of directory data blocks comprises mappings from a parent directory to the directory inode number and also mappings from names of any children file system entities (directories and files) to their respective inode numbers. For instance, the content of the root directory, contained within DBN 2000, is depicted as including mappings from the root directory name "." to inode number 64, from dir1 to inode number 100, and from dir2 to inode number 120. Similarly, the content of dir1, contained within DBN 2100, is depicted as including its own name-to-inode number mapping as well as mappings from its parent directory name to inode number 64, from file1 to inode number 140, and from file2 to inode number 160. The content of the file data blocks, such as the data blocks assigned DBNs 1000, 1100, 1200, 1300, and 1400, contain the file data content. As shown in FIG. 1, file inodes i_140 and i_160 each include pointers to multiple DBNs, with inode i_140 pointing to DBNs 1000, 1100, 1200, and 1300, and inode i_160 pointing to DBNs 1400 and 1200. In this manner, file1 (via inode i_140) and file2 (via inode i_160) share DBN 1200 by including respective pointers 125 and 129 that point to the same DBN 1200 such as may occur in a case of deduplication if the data content of DBN 1200 was determined be identical to the data content of another data block.

The depicted primary storage system further comprises an OBS bridge 135 for processing file system entities received from file system storage 115 such as during data backup to a secondary storage system depicted in FIG. 1 as OBS 145. Among other components not depicted to avoid obfuscation, OBS bridge 135 includes a replication engine 138 that is configured to parse and map file system entities received within replication operations into OBS objects to be stored within OBS 145. The processing of replication engine 138 provides file system to OBS mapping in a manner that preserves storage efficiency that may be attained such as via deduplication and/or compression. Replication engine 138 includes a parser (not depicted) that processes replication streams received from storage server 105 to identify various categories of file system constructs to be used in generating corresponding OBS objects. As depicted, replication engine 138 identifies one or more of inodes i_64, i_100, i_120, i_140, and i_160 that may be included in replication operations (e.g., insert, delete) that constitute a replication stream. In response to detecting the inodes, such as may occur during a baseline file system replication, replication engine 138 generates one or more corresponding OBS objects. In the depicted aspect, replication engine 138 generates a set of inode objects I_OBJ_1 through I_OBJ_N that contain the file/directory attribute metadata and reference pointer information contained by the corresponding inodes. Replication engine 138 is further configured to generate a set of data objects DAT_OBJ_1 through DAT_OBJ_M that contain the data block content of file system entities represented by the inodes.

OBS bridge 135 further includes a file system catalog for collecting and/or generating particular categories of metadata that can be processed in response to file system client access requests. As depicted, the file system catalog includes a database populator tool 142 and a metadata database 140. Populator tool 142 is configured as part of (e.g., as an execution thread within) replication engine 138. Populator tool 142 is configured to identify and read specified types of replication operations. For instance, populator tool 142 may be configured to identify directory replication operations for replicating a directory entity within OBS 145 and to identify reference replication operations for replicating modifications to reference pointers. In response to reading data from the replication operations, populator tool 142 generates and populates catalog records within metadata database 140.

FIG. 1 depicts metadata database 140 as including the baseline PTI records for the file system volume represented within file system storage 115 by inode file 120. Namely, metadata database 140 includes records for each of file system entities root, dir1, dir2, file1, and file2, which are generated by populator tool 142 during baseline replication. As shown, each record (depicted row-wise) includes an inode number field, I_NUM, a parent inode number field, PI_NUM, an entity type field, TYPE, a PTI identifier field, PTI_ID, an absolute path field, PATH, an operation field, OP, and a reference pointer field, REF_PTR. The field entries for a given record are inherently logically associated by virtue of being a within a same database record.

The depicted catalog records for all of the file system entities include SS0 (snapshot0) as the PTI_ID entry, indicating that all records were generated from the baseline replication. The TYPE field entries identify the record as associated either with a directory or a file. The I_NUM field entries in association with the corresponding PI_NUM field entries provide hierarchical inode number relationship data within each individual record. For example, the depicted catalog record for the directory dir1 was generated by populator tool 142 to include inode number "100" as the entry for the I_NUM and "64" as the inode number entry for the PI_NUM field. In this manner, a single catalog record can be accessed in response to a request to access a secondary storage data item to determine a hierarchical inode relationship without having to traverse the OBS representation of inodes within OBS 145.

The PATH entries comprise full pathnames for the respective file system entities, such as /dir1/file1 for the depicted catalog record for file1. The OP field entries indicate the type of replication operation (e.g., INSERT, DELETE) that is being performed on the subject inode. The REF_PTR field entries include one or more reference pointers that are included in the inode. For example, the REF_PTR entry for the inode 100 (dir1) record is a block pointer from FBN 0 to DBN 2100. Furthermore, each of the REF_PTR entries may comprise multiple reference pointers such as the REF_PTR entry for inode 140 (file1) which includes pointers from FBNs 0, 1, 2, and 3 to DBNs 1000, 1100, 1200, and 1300, respectively.

Figure 2:
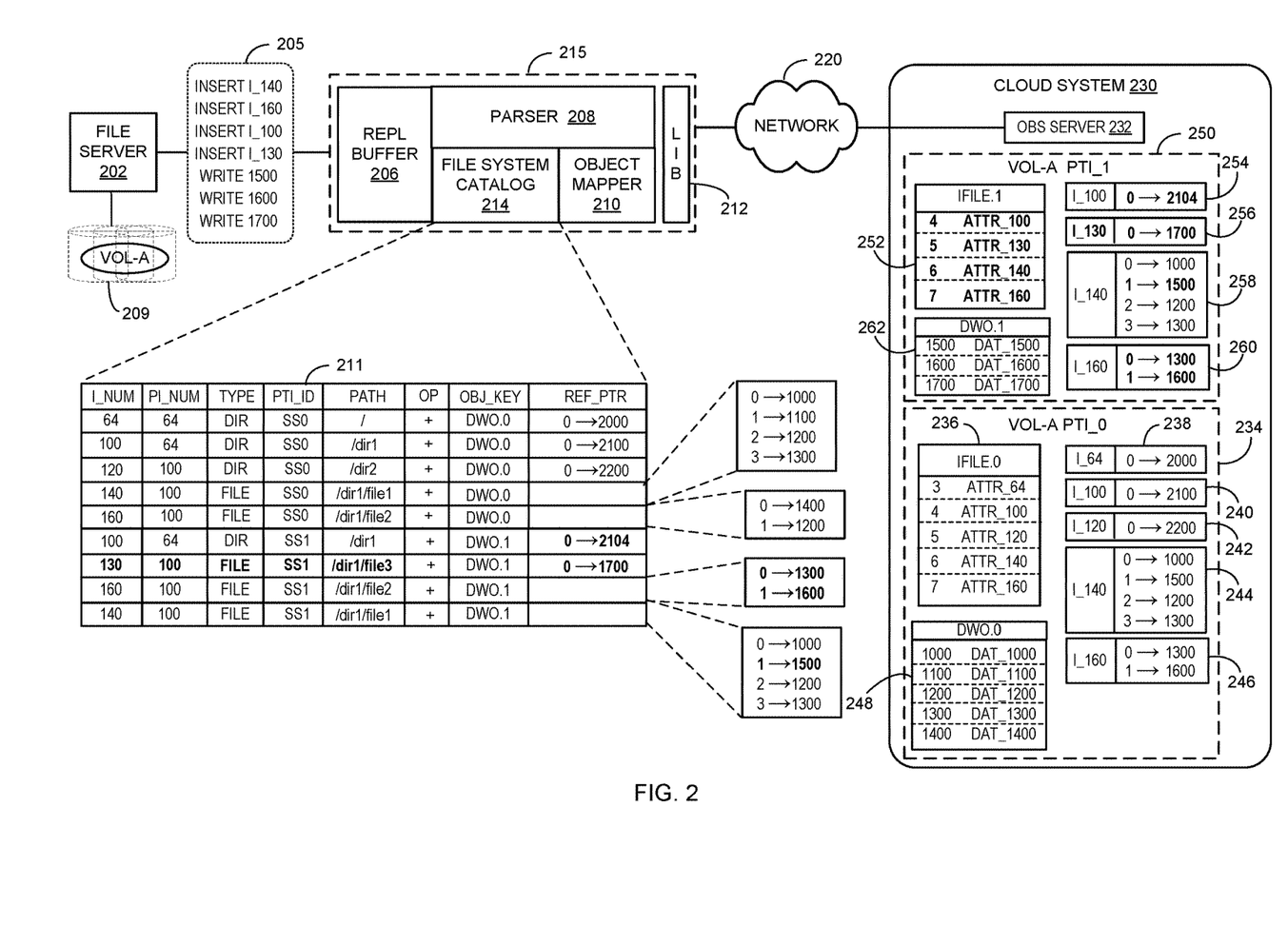
FIG. 2 is a block diagram illustrating a storage replication system that may be utilized for processing replication streams including point-in-time image (PTI) replication streams in accordance with an aspect.

FIG. 2 is a block diagram illustrating a storage replication system comprising subsystems and components for processing replication streams including point-in-time image (PTI) replication streams in accordance with an aspect. The system shown in FIG. 2 includes a file server 202 that provides shared network access to a file system storage volume, Vol-A, portions of which may be stored across storage devices 209. VOL-A includes the inode-based structural aspects depicted and described with reference to FIG. 1, including a root directory that contains directories, dir1 and dir2. Vol-A further includes inode and block pointer structures that form multiple PTIs (e.g., snapshots), including an active file system image and one or more PTIs that preserve pointer and data block information of previous file system images at respective points in time. As utilized herein, a PTI, is essentially a point-in-time copy of a file system and/or a point-in-time copy of the state of the file system. PTIs may be generated periodically and/or based on system events or conditions to provide a level of data protection and recovery capacity.

File server 202 may execute replication cycles in which VOL-A is replicated as a backup image in OBS. The objects for the file-system-to-OBS replication are generated by a replication engine 215 using a data layout that preserves the storage management operations (e.g., storage snapshot and deduplication) that are available in the file system and with block level storage. The secondary (or backup) storage system is embodied within a cloud storage system 230 that is communicatively connected to file server 202 via a network 220. The depicted cloud storage system 230 includes an OBS server 232 that provides access to and manages object containers 234 and 250. Object container 234 has an assigned container name, PTI_0, and corresponds to a PTI for VOL-A at the time the VOL-$A_{PTI\_0}$ PTI was the active file system image (i.e., at the point at which the VOL-$A_{PTI\_0}$ PTI was recorded). The container name may be included in HTTP URLs to locate and access objects within the container.

Similar to replication engine 138, replication engine 215 maps file system entities to OBS objects in a manner that preserves PTIs and storage efficiency mechanisms such as via deduplication and/or compression. As depicted, replication engine 215 comprises a replication buffer 206, a parser 208, an object mapper 210, and an OBS protocol interface library 212. Replication buffer 206 initially receives and processes replication streams generated by file server 202. Specifically, replication buffer 206 may be configured to sequentially order replication operations and/or the constituent components of the replication operations including data blocks, inodes, and possibly other file system entities for optimal processing by parser 208 and object mapper 210. Parser 208 is configured, using any combination of coded software, firmware, and/or hardware, to selectively identify and interpret each of the replication operations and constituent file system entities in a given replication stream and to provide the resultant identified operation, entity and sub-entity information to object mapper 210. Parser 208 may also be configured to read and associate the respective data block content with each of the DBNs. For received inodes, parser 208 may be configured to identify inodes and read the respective metadata content as well as the block pointers. Object mapper 210 is configured, using any combination of coded software, firmware, and/or hardware, to map the parsed portions of the file system entities into OBS objects such as may be contained in object containers 234 and 250 within cloud storage system 230.

For example, assume that a baseline replication cycle is performed for comprehensively replicating VOL-A in its entirety at the point designated in FIG. 2 as PTI_0. File server 202 sends a replication stream in the form of multiple replication operations (not depicted) to be processed by replication engine 215. Parser 208 identifies multiple INSERT and WRITE operations within the baseline replication stream that include operations to insert directory inodes 64, 100, and 120. Parser 208 further identifies the inodes i_64, i_100, i_120, which are included in the insert directory operations. The INSERT operations further include file inode insert replication operations for inserting file inodes having inode numbers 140 and 160. Parser 208 identifies the file insert operations and further identifies the corresponding inodes i_140 and i_160 included in the insert operations.

In response to parser 208 detecting the directory and file insert operations including the respective directory and file inodes, object mapper 210 generates one or more corresponding OBS objects. As depicted, object mapper 210 generates an inode object 236 within container 234 having an object ID, IFILE.0, and containing the file/directory attribute metadata information recorded by the corresponding inodes. Object ID, IFILE.0, serves as an access key that may be specified in client/server access requests to access inode object 236 within OBS container 234. Inode object 236 further records the FBNs, 3, 4, 5, 6, and 7 of the file blocks of the inode file, and logically associates the inode file FBNs with corresponding attribute metadata contained in each of the inodes. While not expressly depicted, each of the IFILE.0 metadata entries, ATTR_64, ATTR_100, ATTR_120, ATTR_140, and ATTR_160 contains the inode number and attribute metadata of the respective underlying file system entity (e.g., file or directory) represented by inodes i_64, i_100, i_120, i_140, or i_160.

In addition to detecting and mapping the inode metadata into OBS objects, replication engine 215 may detect or otherwise identify the block pointer references contained in each of the inodes. For instance, replication engine 215 may identify pointers from an FBN of the root directory (represented by inode i_64) to DBN 2000. Similarly, replication engine 215 identifies the pointers from the FBNs of dir1 and dir2 (represented by inodes i_100 and i_120) to DBNs 2100 and 2200, respectively. Replication engine 215 also identifies the reference pointers from FBNs of file file1 to DBNs 1000, 1100, 1200, and 1300, and from the FBNs of file2 to DBNs 1400 and 1200.

Having identified the reference pointers within the inodes received in the replication stream, replication engine 215 generates a set of one or more indirection objects that each logically associate FBNs of the file system entities represented by the inodes with respective ones of DBNs that correspond to the data blocks received in the replication stream. Specifically, the set of indirection objects comprises indirection objects 238, 240, 242, 244, and 246 that respectively include object IDs i_64, i_100, i_120, i_140, and i_160, which correspond to the inode numbers of the inodes and are used as access keys to the object within OBS container 234. In addition to having an object ID corresponding to an inode number, each of the indirection objects includes one or more data entries that each logically associates a FBN of the file system entity with a corresponding DBN. For example, indirection object 240 includes an object ID I_100 corresponding to inode number 100 and further includes a single data entry embodied as a pointer from FBN 0 of dir1 to DBN 2100. Indirection object 244 includes an object ID i_140 corresponding to inode number 140 and further includes data entries (pointers) that logically associate FBNs 0, 1, 2, and 3 of file1 with DBNs 1000, 1100, 1200, and 1300, respectively.

During baseline replication, replication engine 215 further detects the data content of file system entities such as the content of dir1, dir2, file1, and file2 and generates a corresponding data object 248. Data object 248 contains the data blocks received in the replication stream and also records and logically associates data block numbers with the data blocks. Data object 248 includes an object ID, DWO.0, which is used as an access key to the object within OBS container 234. Data object 248 further includes data content in the form of multiple consecutive DBN entries 1000, 1100, 1200, 1300, 1400, 2000, 2100, and 2200, which respectively correspond to the DBNs of the data blocks received in the replication stream. The data content of data object 248 further includes multiple data content entries each corresponding to one or the DBN entries and represented in FIG. 1 as DAT_1000, DAT_1100, DAT_1200, DAT_1300, DAT_1400, DAT_2000, DAT_2100, and DAT_2200. While not expressly depicted, the data content entries each contain the file content data of a data block contained within the respective underlying file system entity.

In the foregoing manner replication engine 215 effectuates logical replication of the baseline VOL-A file system structures into an OBS format within object container 234 that includes the collection of baseline objects that constitute a full file system image. Storage efficiency mechanisms such as deduplication are preserved, in part by preserving the primary (sources) FBN-to-DBN mappings in the indirection objects.

VOL-A has been modified in several ways from the point in time at which the baseline VOL-A PTI, VOL-$A_{PTI\_0}$ PTI, was generated to the current baseline image represented as VOL-$A_{PTI\_1}$. The changes include a modification to FBN 1 of file1 (e.g., resulting from a WRITE operation) that results in the corresponding inode block pointer being modified to point to the new data at the new DBN 1500. The changes to the file system further include modification of FBN 0 of file2 so that the data content of file2 FBN 0 matches the data content of FBN 3 of file1 which points to DBN 1300 within the file1 inode. In response to detecting the data block modification, a block-level deduplication cycle has modified the block pointer for file2 FBN 0 to point to DBN 1300. FBN 1 of file2 has also been modified so that the file2 FBN1 inode pointer has been changed to point to DBN 1600 that contains the modified data. The foregoing modifications to block pointers in the inodes that represent file1 and file2 result in corresponding modifications to the metadata for dir1. In addition to the modifications to file1 and file2, a new file system entity, file3, has been added to dir1. The file3 entity is represented by a newly assigned inode (not depicted) that includes a block pointer from file3 FBN 0 to DBN 1700.

At a specified replication period or in response to an event-based trigger, such as a client request for replication, file server 202 initiates an incremental replication of the data within VOL-A that has been modified from the point at which object container 234 was generated. In an aspect, file server 202 transmits a replication request including or followed by a replication stream that comprises a stream of replication operations 205. As depicted, the stream of replication operations 205 includes INSERT and WRITE operations for inodes and corresponding data blocks that have been modified since the VOL-$A_{PTI\_0}$ PTI. Specifically, replication operations 205 include WRITE operations for writing the modified data blocks for file1 and file2 to new locations having DBNs 1500 and 1600. The WRITE operations further include an operation to write the new data block at DBN 1700 that contains the data content of new file3. The INSERT operations further comprise file inode insert operations, INSERT_140 and INSERT_160, that include file inodes i_140 and i_160. Referring to FIG. 1 in conjunction with FIG. 2, inode i_140 (representing file1) and inode i_160 (representing file2) are included in INSERT_140 and INSERT_160 due to updates in the respective inode block pointers. The insert operations further include a directory inode insert operation, INSERT_100, which included due to changes to dir1 metadata and INSERT_130 is included due to the creation of file3 and its corresponding inode 130 within VOL-A.

Object container 250 is depicted in FIG. 2 as including the objects generated by replication engine 215 from replication operations 205. Included among the incremental replication objects is inode object 252, which includes an object ID, IFILE.1, and a set of entries each comprising an inode file FBN within which the respective inode is contained. For instance, the third entry in inode object 252 includes FBN "6", which is the inode file FBN in which the corresponding inode i_140 is contained. Each of the inode object 252 entries further includes the metadata for a respective one of the file system entities represented by the inode. For example, the second entry in inode object 252 comprises the attribute metadata (i.e., metadata except for block pointers) for file3 that was added in the VOL-$A_{PTI\_1}$ PTI.

Object container 250 further includes an indirection object 254 that was mapped/generated by replication engine 215 using parsed information from directory inode 100. As depicted, the content of indirection object 254 comprises a pointer from FBN0 of dir1 to the new location (DBN 2104) of the data block corresponding to dir1 FBN 0. Indirection objects 256, 258, and 260 are mapped/generated by replication engine 215 using parsed information from file inodes 130, 140, and 160, respectively. Indirection object 256 is itself an addition to the set of indirection objects included in object container 234 for PTI_0 due to the addition of an entirely new file, file3. Indirection objects 258 and 260 include highlighted modifications from the corresponding indirection objects within container 234. Namely, indirection object 258 includes a new block pointer from FBN 1 to DBN 1500, and for indirection object 260 the previous pointers from FBNs 0 and 1 to DBNs 1200 and 1400 have been replaced by pointers to DBNs 1300 and 1600.

To address the changes to data blocks, reflected in DBNs 1500, 1600, and 1700, object container 250 further includes a data object 262 having an object ID DWO.1. The object ID may be used by the server and/or clients to access the data object 262 within container 250. Data object 262 further includes content in the form of the added/modified data blocks DAT_1500, DAT_1600, and DAT_1700, each having a respective entry and associated with the respective DBNs 1500, 1600, and 1700.

The depicted system further includes components and subsystems for generating per-PTI metadata records for the OBS objects generated during baseline and incremental replication. To this end, a file system catalog 214 is incorporated within the execution environment of replication engine 215. File system catalog 214 is configured, using any combination of coded software, firmware, and/or hardware, to selectively identify and interpret each of the replication operations and constituent file system entities in a given replication stream. File system catalog 214 collects and/or generates resultant metadata relating to one or more of the replication operations to enable per object and per PTI metadata to be recorded in a metadata table 211. Metadata table 211 includes multiple catalog records generated and inserted by the file system catalog logic and may be locally stored in memory and/or in persistent, non-volatile storage.

File system catalog 214 therefore includes logic components for populating the metadata table 211 (e.g., a database populator tool such as depicted in FIG. 1) as well as query handling logic that processes client requests for information relating to replicated file system entities.

In an aspect, file system catalog 214 may include a database populator thread (not depicted) that identifies replication operations, such as the INSERT operations included in replication operations 205 and generates corresponding catalog records. As shown in FIG. 2, file system catalog 214 has generated multiple records (depicted row-wise) within metadata table 211 that each may be indexed by one or more of the column field data categories. Similar to the depiction in FIG. 1, the column field data categories include an inode number field, I_NUM, a parent inode number field, PI_NUM, an entity type field, TYPE, a PTI identifier field, PTI_ID, an absolute path field, PATH, an operation field, OP, an object key field, OBJ_KEY, and a reference pointer field, REF_PTR. In an aspect, file system catalog 214 identifies directory inode replication operations and generates one or more corresponding records within metadata table 211. For instance, in response to determining that the INSERT_100 operation is a directory inode insert operation, file system catalog 214 generates the sixth record within metadata table 211. As shown, this record includes the same inode-to-parent inode association (100 to 64) and the same absolute path (/dir1) as the second record within the table. However, the SS1 record for dir1 differs from the SS0 record in terms of the REF_PTR entries with FBN 0 indicated as pointing to DBN 2104 in SS1.

As shown in FIG. 2, the first five records may be indexed as associated with the VOL-$A_{PTI\_0}$ PTI based on the SS0 entries within each of the PTI ID fields. The next four records may be indexed as associated with the VOL-$A_{PTI\_1}$ PTI based on the SS1 entries within the PTI ID fields. In this manner, file system catalog 214 may process a client or server requests that specify a particular snapshot (e.g., SS1) and process only those records that are included within and those that precede the specified snapshot.

Figure 3:
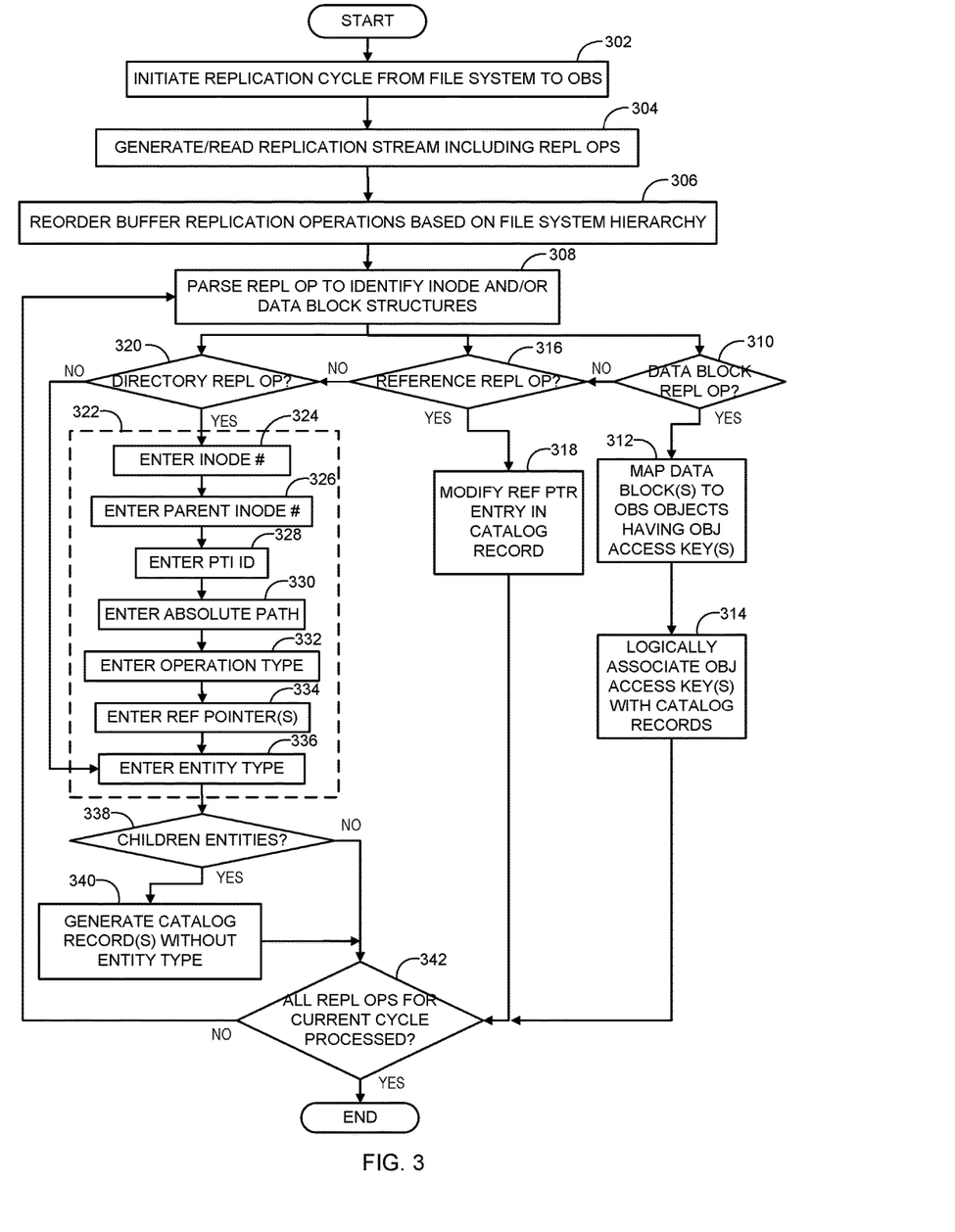
FIG. 3 is a flow diagram depicting operations and functions for populating a metadata database during storage replication in accordance with an aspect.

FIG. 3 is a flow diagram depicting operations and functions for populating a metadata database during storage replication in accordance with an aspect. The process begins as shown at block 302 with a replication engine receiving a signal indicating initiation of a replication cycle from a source file system storage to an OBS secondary system. A source file system server generates a stream of replication operations that include data items such as inodes and data blocks as operands and the resultant replication stream is received by the replication engine (block 304). For example, the replication stream may include operations in which inodes and/or data blocks are inserted or deleted based on a point-in-time image (PTI) (sometimes referred to as a snapshot) of the file system. The stream of replication operations may be received in a sequence that may or may not correspond to the order in which the resultant OBS objects are to be generated within the secondary system. At block 306, the replication engine reorders the incoming replication operations within a replication operations buffer based on a specified order in which file system entities are to be replicated as OBS objects. In one aspect, the replication operations may be reordered by the replication engine based on the file system hierarchy. The process continues as shown at block 308 with the replication engine parsing a next (based on replication buffer order) replication operation to identify inodes, inode metadata, reference pointers, and data blocks.

At blocks 310, 316, and 318, the replication engine determines the type of data structure (directory inode, file inode, or data block) that the operation is directed to. In response to determining that the replication operation is directed to one or more data blocks (e.g., data block WRITE operation), the replication engine maps the data block(s) into one or more corresponding OBS data objects having respective object IDs that may be processes processed as access keys (block 312). At block 314, the file system catalog logically associates the object IDs/keys with respective ones of catalog records based on the block addresses within the reference pointers of the data block(s).

As shown at blocks 316 and 318, in response to determining that the replication operation is a reference replication, a database populator tool adds or modifies a reference pointer to a corresponding record within the metadata database. If the replication engine determines that the replication operation is an insert directory inode operation, the populator tool generates a catalog records as shown within superblock 322. The substeps depicted within superblock 322 result in a single records comprising logically associated entries that may be indexed in various ways. The process of generating the catalog record includes entering the inode number (block 324) corresponding to the directory that is being inserted. In addition, the parent inode number is entered in the record (block 326) in order to maintain the hierarchical link in the file system namespace within the catalog record. The populator tool inserts a PTI ID as shown at block 328, thus enabling a database query handler to index database entries based on a requested PTI. The populator tool further inserts an absolute path of the directory beginning with the root directory (block 330). The absolute path may be completed for the directory itself or, for a child entity, may need to be completed once a replication operation corresponding to the child entity is read and processed.

At block 332, the populator tool enters the type of operation being performed on the directory inode (e.g., INSERT, DELETE) and at block 334, the tool enters one or more reference pointers from FBNs of the directory (typically a single FBN for a directory) to corresponding DBNs. At block 336 either during the generation of a directory inode records or in response to identifying the replication operation as a file inode operation, the populator tool enters the type (DIR for directory) of the file system entity corresponding to the inode specified by the replication operation. It should be noted that the sequence of operations within superblock 322 may vary. Next, at block 338 the populator tool determines whether the directory inode specifies that the directory includes children entities (files or directories). In response to determining that the directory includes children entities, the populator tool generates catalog records for each child entity (block 340) by traversing all except block 336 within superblock 322. In response to generating the child entity records, or in response to determining that the directory includes no further child entities, the populator tool determines whether any replication operations remain to be processed (block 342). If so, the populator tool returns control to block 308 at which the process cycles to a next, buffered replication operation.

Figure 4:
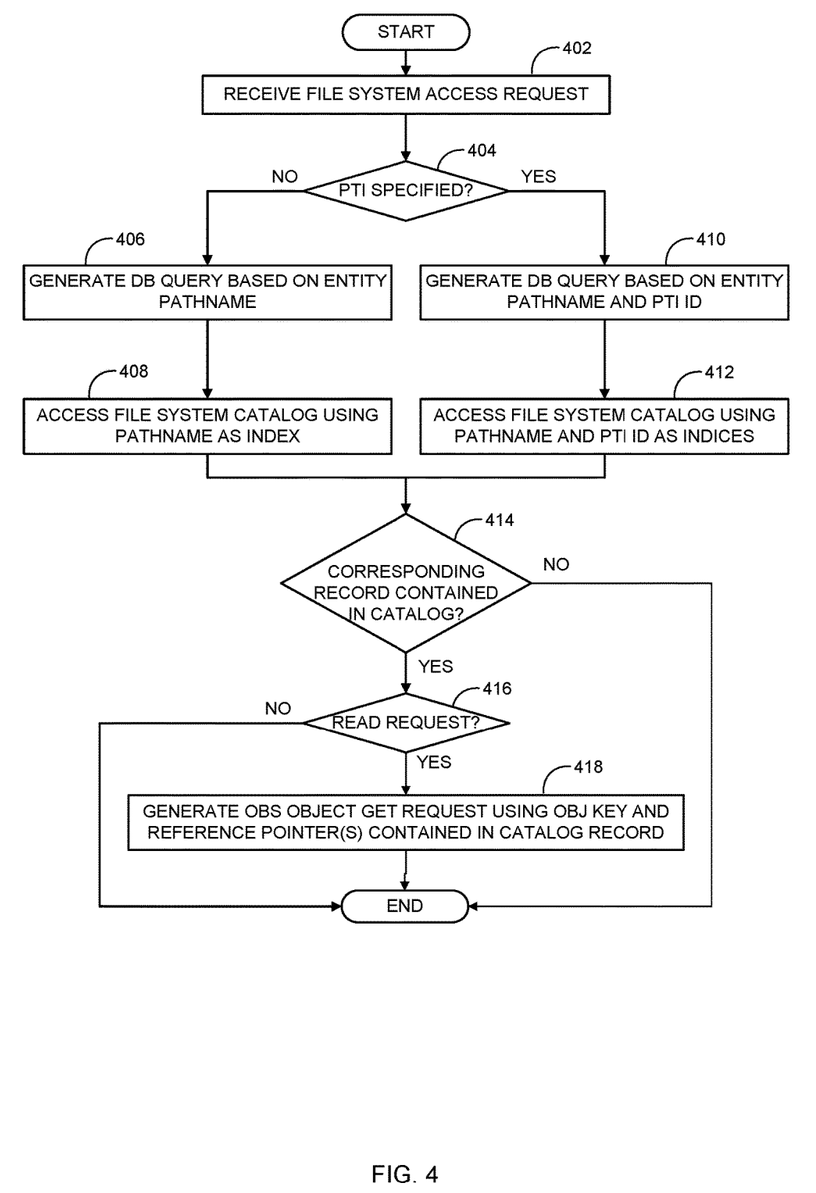
FIG. 4 is a flow diagram illustrating operations and function for utilizing a file system catalog to access file system entities that have been replicated as OBS objects.

FIG. 4 is a flow diagram illustrating operations and function for utilizing a file system catalog to access file system entities that have been replicated as OBS objects. The process depicted in FIG. 4 may be implemented by a database query handler configured within a file system catalog, such as the file system catalogs depicted and described with reference to FIGS. 1-3. The process begins as shown at block 402 with the database query handler receiving a file system access request such as may be transmitted by a file server in response to a client request. For instance, the access request may be a request to read a directory or a file that specifies the directory or file by a file system pathname. The access may or may not further specify a particular PTI, such as a baseline snapshot. In response to the access request not specifying a PTI, the query handler generates a database query based on the pathname (blocks 404 and 406). Records within a metadata database table that has been populated as described with reference to FIGS. 1-3 are accessed using the generated query (block 408). More specifically, the metadata database query handler may apply the pathname as an index to identify matching records based on matching absolute path entries in the records.

In response to detecting a PTI ID specified by the access request, the query handler generates a database table query based on the PTI ID and the file system entity pathname (blocks 404 and 410). Records within a metadata database table are accessed using the generated query which specifies the pathname and PTI ID as search indices (block 412). If the corresponding records are located within the database, and if the request is a directory or file read request, the query handler generates an OBS GET request using the object key(s) and reference pointers contained in the located records (blocks 414, 416, and 418).

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
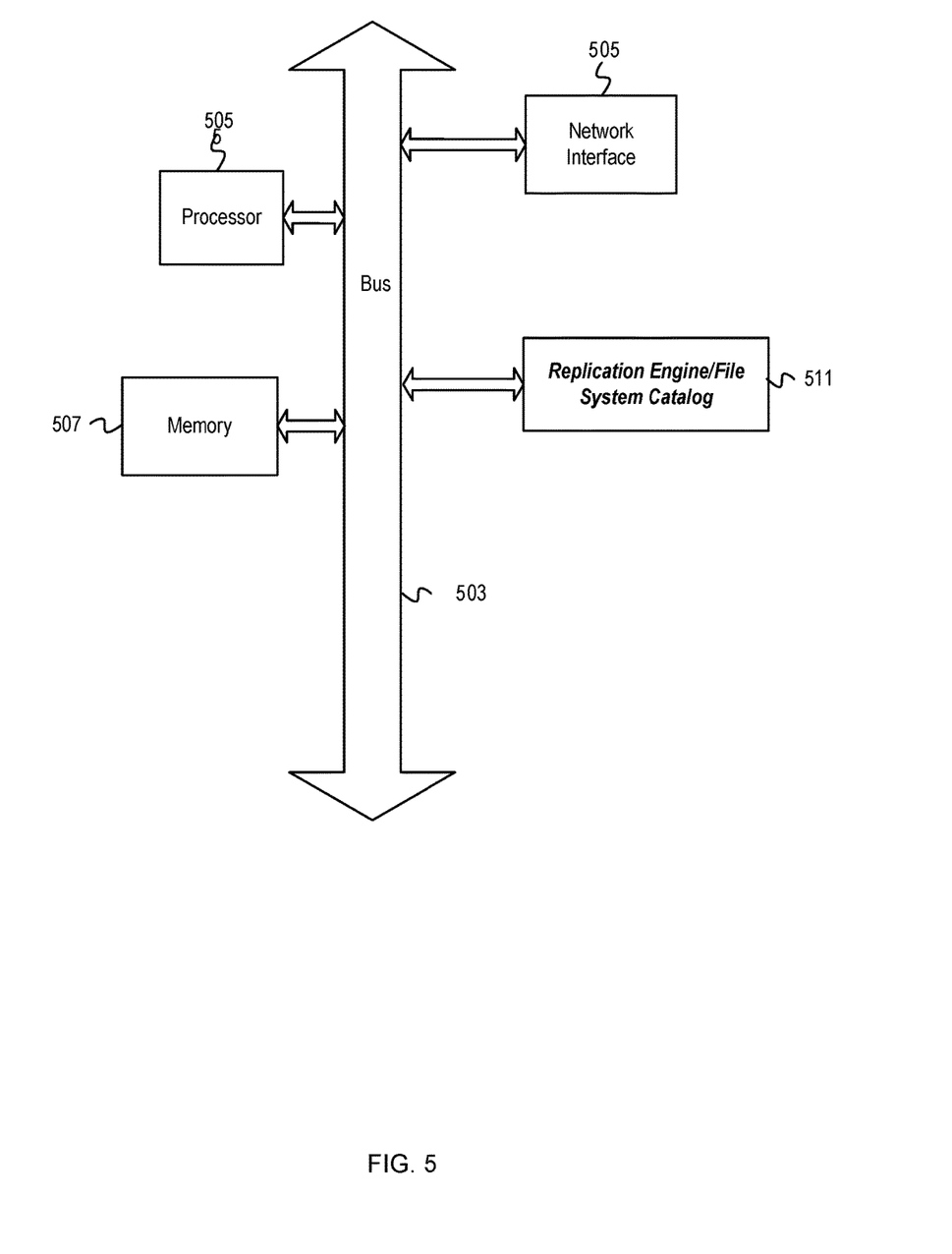
FIG. 5 depicts an example computer system with a file system catalog in accordance with an aspect.

FIG. 5 depicts an example computer system with a replication engine that implements a file system catalog in accordance with an aspect. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport® bus, InfiniBand® bus, NuBus, etc.) and a network interface 505 (e.g., a Fiber Channel interface, an Ethernet interface, an internet small computer system interface, SONET interface, wireless interface, etc.). The system also includes a replication engine 511 that implements a file system catalog 513. The replication engine 511 processes replication and recovery requests, transactions, and data for servicing a source storage system and/or one or more storage clients. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for a replicating file system storage into object-based storage as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

What is claimed is:
1. A method comprising:
reading a plurality of replication operations; and
for at least one of the replication operations,
determining that an inode is an operand of the replication operation, and generating one or more catalog records that each include and logically associate an inode number, a point-in-time-image (PTI) ID, and an operation; and
receiving a file system access request that specifies a file system entity having an entity pathname and a PTI ID, generating a query to a file system catalog that contains the catalog records, and reading catalog records having the same entity pathname and the PTI ID specified in the query.

2. The method of claim 1, wherein determining that the inode is an operand of the replication operation comprises determining that the replication operation is an inode insert or inode delete operation.

3. The method of claim 1, further comprising:
in response to determining that the inode is a directory inode that represents a directory,
generating a catalog record for a file system entity contained in the directory.

4. The method of claim 1, further comprising:
in response to receiving a replication operation that specifies an inode of a file system entity contained in a directory, inserting an object key in a catalog record for the file system entity contained in the directory.

5. The method of claim 1, wherein said generating one or more catalog records further includes inserting one or more reference pointers into each of the catalog records, wherein the one or more reference pointers map file block numbers (FBNs) to data block numbers (DBNs).

6. The method of claim 1, wherein the replication operations are received in a replication stream that includes data blocks, said method further comprising:
logically associating object access keys with respective ones of the catalog records based on reference pointers in each of the catalog records.

7. A non-transitory machine readable medium having stored thereon instructions for performing a method implemented by machine executable code which when executed by at least one machine, causes the machine to:
read a plurality of replication operations; and
for at least one of the replication operations,
determine that an inode is an operand of the replication operation, and generate one or more catalog records that each include and logically associate an inode number, a point-in-time-image (PTI) ID, and an operation; and
receive a file system access request that specifies a file system entity having an entity pathname and a PTI ID, generate a query to a file system catalog that contains the catalog records, and read catalog records having the same entity pathname and the PTI ID specified in the query.

8. The non-transitory machine readable medium of claim 7, wherein the machine executable code which when executed by at least one machine, causes the machine to determine that the inode is an operand of the replication operation comprises machine executable code which when executed by at least one machine, causes the machine to determine that the replication operation is an inode insert or inode delete operation.

9. The non-transitory machine readable medium of claim 7, further comprising machine executable code which when executed by at least one machine, causes the machine to:
in response to determining that the inode is a directory inode that represents a directory,
generate a catalog record for a file system entity contained in the directory.

10. The non-transitory machine readable medium of claim 7, further comprising machine executable code which when executed by at least one machine, causes the machine to:
in response to receiving a replication operation that specifies an inode of a file system entity contained in a directory, insert an object key in a catalog record for the file system entity contained in the directory.

11. The non-transitory machine readable medium of claim 7, wherein said machine executable code to generate one or more catalog records further includes machine executable code to insert one or more reference pointers into each of the catalog records, wherein the one or more reference pointers map file block numbers (FBNs) to data block numbers (DBNs).

12. The non-transitory machine readable medium of claim 7, wherein the replication operations are received in a replication stream that includes data blocks, said non-transitory machine readable medium further comprising machine executable code which when executed by at least one machine, causes the machine to:
logically associate object access keys with respective ones of the catalog records based on reference pointers in each of the catalog records.

13. A computing device comprising:
a memory comprising a machine readable medium having machine executable code stored thereon; and
a processor coupled to the memory, the processor configured to execute the machine executable code to cause the processor to:
read a plurality of replication operations; and
for at least one of the replication operations,
determine that an inode is an operand of the replication operation, and generate one or more catalog records that each include and logically associate an inode number, a point-in-time-image (PTI) ID, and an operation; and
receive a file system access request that specifies a file system entity having an entity pathname and a PTI ID, generate a query to a file system catalog that contains the catalog records, and read catalog records having the same entity pathname and the PTI ID specified in the query.

14. The computing device of claim 13, wherein the processor is configured to execute the machine executable code to cause the processor to determine that the replication operation is an inode insert or inode delete operation.

15. The computing device of claim 13, further comprising the processor configured to execute the machine executable code to cause the processor to:
in response to determining that the inode is a directory inode that represents a directory,
generate a catalog record for a file system entity contained in the directory.

16. The computing device of claim 13, further comprising the processor configured to execute the machine executable code to cause the processor to:
in response to receiving a replication operation that specifies an inode of a file system entity contained in a directory, insert an object key in a catalog record for the file system entity contained in the directory.

17. The computing device of claim 13, wherein said machine executable code to generate one or more catalog records further includes machine executable code to insert one or more reference pointers into each of the catalog records, wherein the one or more reference pointers map file block numbers (FBNs) to data block numbers (DBNs).

18. The computing device of claim 13, wherein the replication operations are received in a replication stream that includes data blocks, said computing device further comprising the processor configured to execute the machine executable code to cause the processor to:
logically associate object access keys with respective ones of the catalog records based on reference pointers in each of the catalog records.

* * * * *